C. L. ARCHER.
CORD TIRE.
APPLICATION FILED JULY 1, 1916.
1,219,420.
Patented Mar. 20, 1917.
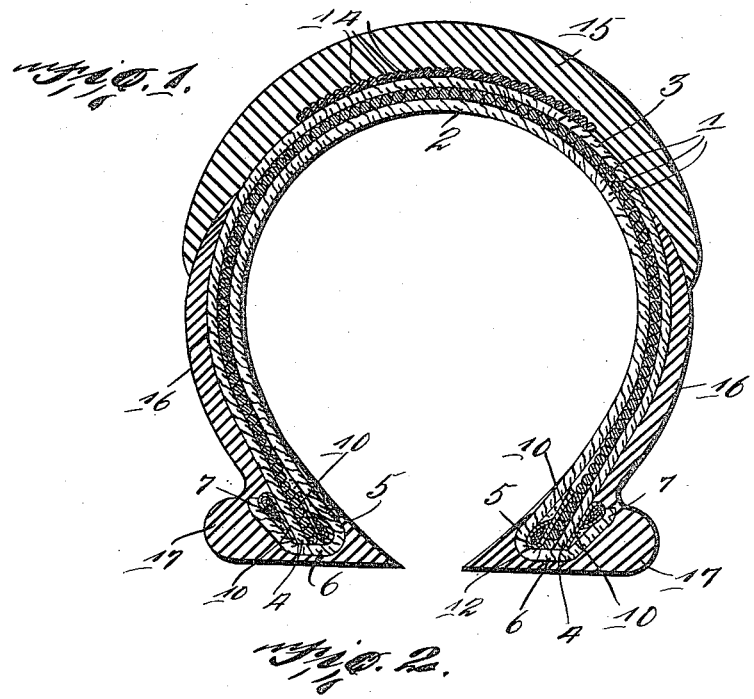
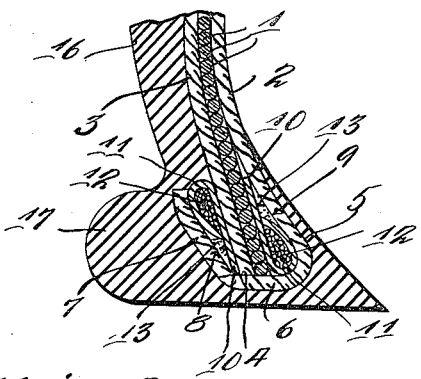
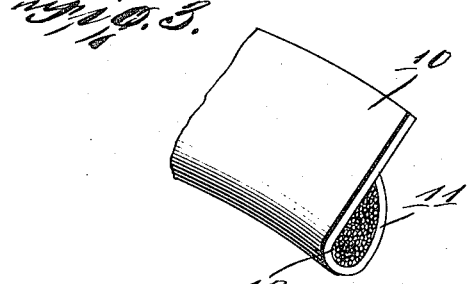
Inventor
C. L. Archer
By E. E. Vrooman & Co.,
his Attorneys

UNITED STATES PATENT OFFICE.

CHARLES L. ARCHER, OF MINNEAPOLIS, MINNESOTA.

CORD TIRE.

1,219,420.　　　　　Specification of Letters Patent.　　Patented Mar. 20, 1917.

Original application filed June 8, 1916, Serial No. 74,497. Divided and this application filed July 1, 1916.
Serial No. 107,068.

*To all whom it may concern:*

Be it known that I, CHARLES L. ARCHER, a citizen of the United States of America, residing at Minneapolis, in the county of Hennepin and State of Minnesota, have invented certain new and useful Improvements in Cord Tires, of which the following is a specification, reference being had therein to the accompanying drawing.

This invention relates to a cord tire and is the divisional subject-matter divided out of my prior application, Serial Number 74,497, allowed June 8, 1916.

The principal object of this invention is the production of a cord tire which has a plurality of the cords so looped as to provide receiving portions for the cable strips, thereby constituting enlarged heels or beads.

Another object of this invention is the production of a cord tire wherein the transversely extending cords are positioned so as to fit upon the longitudinally extending cords, the inner transversely extending cords being looped over a plurality of the longitudinally extending cords and the outer transversely extending cords so as to form pocket portions in which filler means may be positioned for constituting heels or beads for the tire.

With these and other objects in view this invention consists of certain novel combinations, constructions, and arrangements of parts as will be hereinafter fully described and claimed.

In the accompanying drawing:—

Figure 1 is a transverse section through the cord tire as constructed in accordance with this invention.

Fig. 2 is an enlarged fragmentary sectional view through a portion of the tire, illustrating specifically one of the heels or beads.

Fig. 3 is a fragmentary detail perspective view of one of the cable strips.

Referring to the accompanying drawing by numerals it will be seen that the cord tire comprises a plurality of longitudinally extending cords 1 having positioned upon their inner surfaces the transversely extending cords 2 and upon their outer surface the transversely extending cords 3. It will be seen that the longitudinally extending cords 1 extend entirely around the periphery of the tire, extending in a longitudinal direction, while the transversely extending cords 2 and 3 also extend around the tire, extending across the transverse axis thereof. The ends 4 of the outer transversely extending cords 3 terminate evenly with the longitudinally extending cords 1, as shown in Figs. 1 and 2. The inner transversely extending cords 2, however, are bulged away from the longitudinally extending cords 1, as shown at 5, and then have a looped over portion 6 extending across the longitudinally extending cords 1 to the ends 4 of the outer transversely extending cords 3, while the end portions 7 extending from the looped over portions 6 are spaced from the outer transversely extending cords 3 so as to provide the pocket portion 8. It will further be seen that by having the transversely extending cords 2 bulged outwardly as indicated at 5 there will also be provided an inner pocket portion 9 and it, of course, should be understood that the pockets 8 and 9 extend entirely around the tire adjacent each side thereof.

The cable strip comprises a body 10 having a loop 11 in which there is positioned a heavy cable 12 so as to greatly reinforce the cable strip. A cable strip is positioned within each pocket 8 and 9, as shown in Figs. 1 and 2 so as to greatly reinforce the same for by filling the pockets with these heavy cable strips it will be seen that an enlarged structure is formed upon each side of the cord tire so as to form a heel or bead. After the cable strips have been positioned within the pockets 8 and 9 filler means 13 may be positioned within the pockets, such for instance, as soft rubber, or the like, for holding the cable strips against shifting within the pockets. While, of course, these cable strips will form reinforced structures for forming very strong heels it is necessary to provide the filler means for holding these cable strips against any tendency of shifting, as above stated.

After these cables and cable strips have been positioned upon each other, as above set forth, the cords and heels or beads may be rubberized so as to cause the device to form a substantially one-piece structure, after which it is in condition to receive a suitable casing. It is obvious that at this time the longitudinally extending breaker cords 14 may be positioned in alinement with the tread of the tire upon the outer transversely extending cords after which the rubber tread 15 may be positioned upon the cords and the outer transversely extending cords 3, while the sides 16 having the rubber heels or beads 17 will further fit upon the outer transversely extending cords and will embrace the looped over ends of the inner transversely extending cords, thus greatly reinforcing the same, thereby causing the looped over portions to retain their correct positions, while the fitting of the heels or beads of the cord tire within the rubber heels or beads 17 will cause the rubber heels or beads to be greatly reinforced so as to positively retain the cord tire in its correct position when in use.

From the foregoing description it will be seen that a very simple and efficient cord tire has been provided wherein the cords after being positioned upon each other may be looped so as to constitute pocket portions in which cable strips are positioned so as to form reinforcing heels or beads so that when the outer casing is positioned upon the cords it will be greatly reinforced by reason of the reinforced construction of the heels and beads of the cord tire.

What is claimed is:—

1. In a device of the class described, the combination of a plurality of longitudinally extending cords, outer transversely extending cords positioned upon said longitudinally extending cords, inner transversely extending cords positioned upon said longitudinally extending cords, the ends of said inner transversely extending cords being bulged inwardly and then looped over a plurality of the longitudinally extending cords and over the ends of said outer transversely extending cords, the inner portions of said inner transversely extending cords being spaced away from the outer surface of said outer transversely extending cords, whereby the spaced ends and the inwardly bulged portions will form longitudinally extending pockets adjacent the longitudinally extending cords and the ends of said outer transversely extending cords, means carried within said pockets for filling the same, thereby forming enlarged rigid heels or beads, and a casing positioned upon said cords and heels or beads.

2. In a device of the class described, the combination of a plurality of longitudinally extending cords, outer transversely extending cords positioned upon said longitudinally extending cords, inner transversely extending cords positioned upon said longitudinally extending cords, the ends of said inner transversely extending cords being bulged inwardly and then looped over a plurality of the longitudinally extending cords and over the ends of said outer transversely extending cords, the inner portions of said inner transversely extending cords being spaced away from the outer surface of said outer transversely extending cords, whereby the spaced ends and the inwardly bulged portions will form longitudinally extending pockets adjacent the longitudinally extending cords and the ends of said outer transversely extending cords, cable strips positioned within said pockets, whereby said pockets will be held in their correct positions thereby forming enlarged heels or beads, and an outer casing positioned upon said cords and said heels or beads.

3. In a device of the class described, the combination of a plurality of longitudinally extending cords, outer transversely extending cords positioned upon said longitudinally extending cords, inner transversely extending cords positioned upon said longitudinally extending cords, the ends of said inner transversely extending cords being bulged inwardly and then looped over a plurality of the longitudinally extending cords and over the ends of said outer transversely extending cords, the inner portions of said inner transversely extending cords being spaced away from the outer surface of said outer transversely extending cords, whereby the spaced ends and the inwardly bulged portions will form longitudinally extending pockets adjacent the longitudinally extending cords and the ends of said outer transversely extending cords, cable strips positioned within said pockets, filler means carried within said pockets and engaging said cable strips for holding the same from shifting, whereby said pockets may be held in their correct position thereby forming enlarged heels or beads, and an outer casing carried upon said cords and heels or beads.

4. In a device of the class described, the combination of a plurality of longitudinally extending cords, outer transversely extending cords positioned upon said longitudinally extending cords, inner transversely extending cords positioned upon said longitudinally extending cords, the ends of said inner transversely extending cords being bulged inwardly and then looped over a plurality of the longitudinally extending cords and over the ends of said outer transversely extending cords, the inner portions of said inner transversely extending cords being spaced away from the outer surface of said outer transversely extending cords, whereby the spaced ends and the inwardly bulged portions will form longitudinally extending pockets adjacent the longitudinally extending cords and the ends of the outer transversely extending cords, cable strips positioned within said longitudinally extending pockets, said cable strips comprising fabric sheets inclosing cables, thereby forming a thickened portion adjacent the ends of said outer transversely extending cords, filler means carried within said pockets and engaging said cable strips for holding the same from shifting, and an outer casing positioned upon said thickened portion.

In testimony whereof I hereunto affix my signature.

CHARLES L. ARCHER.